W. BUCKERIDGE.
FOUR WHEELED VEHICLE.
No. 177,799. Patented May 23, 1876.
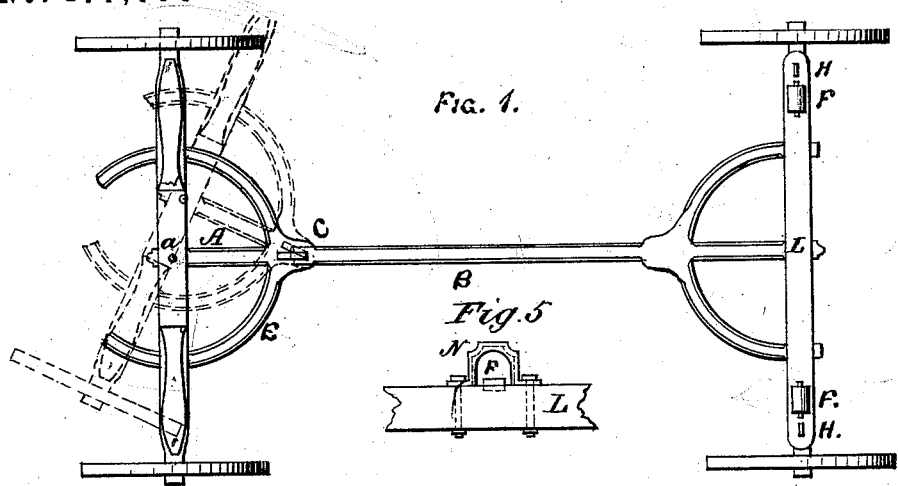
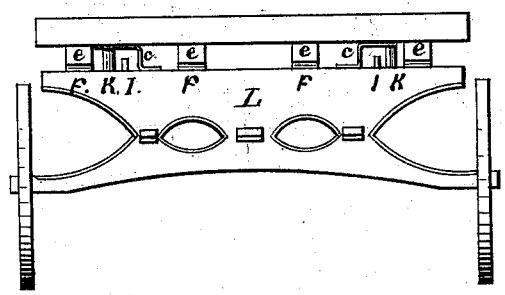
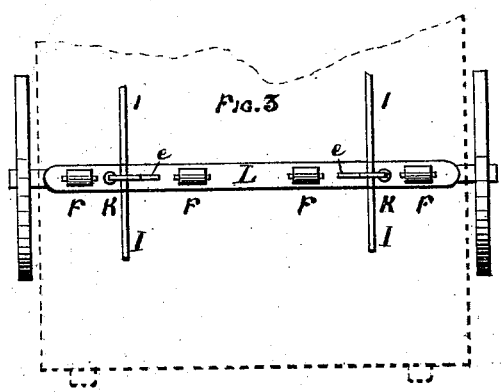
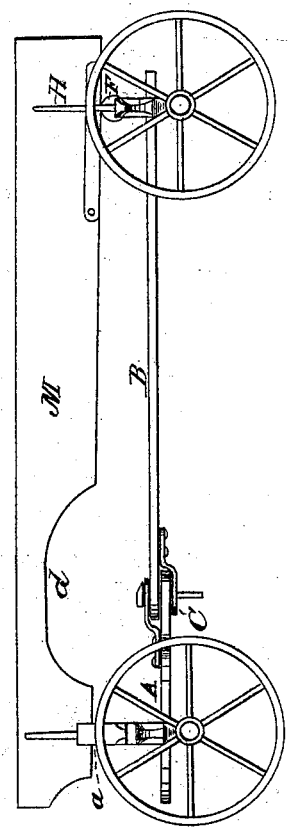
Witnesses:
Frank Whipple
Richard Raseman
Inventor:
William Buckeridge.

UNITED STATES PATENT OFFICE.

WILLIAM BUCKERIDGE, OF PORT HURON, MICHIGAN, ASSIGNOR TO HIMSELF AND JOHN JOHNSTON, OF SAME PLACE.

IMPROVEMENT IN FOUR-WHEELED VEHICLES.

Specification forming part of Letters Patent No. 177,799, dated May 23, 1876; application filed November 8, 1875.

*To all whom it may concern:*

Be it known that I, WILLIAM BUCKERIDGE, of Port Huron, in the county of St. Clair and State of Michigan, have invented a new and Improved Four-Wheeled Vehicle; and I do hereby declare that the following is a full, clear, and exact description of the same.

The invention is an improvement in the class of four-wheeled vehicles provided with a jointed reach, to facilitate turning within narrow limits. I connect the front and rear axles by a jointed reach, without the aid of any supplementary device, and the body of the wagon is pivoted to the front axle and supported on the rear axle by means of friction-rollers, so that it moves freely thereon.

In the accompanying drawing, forming part of this specification, Figure 1 is a plan view of the running-gear of my improved vehicle; Fig. 2, a rear-end elevation; Fig. 3, a top-plan view of the rear axle. Fig. 4 is a side view of the wagon-coupling. Fig. 5 is a detail view.

The front and rear axles are connected by a reach formed in two parts, A B, which are jointed at C, contiguous to the junction of the front hounds E with the part A. The joint is formed by hammer-straps and a pin, as shown in Fig. 4, so that the reach always maintains a horizontal position, whatever be the angle of part B to the front axle. The body of the wagon is connected to the front axle by a pivot-bolt, $a$, and supported on the rear axle by means of friction-rollers F, which are partially sunk in recesses in the bolster L. The stakes H, Figs. 1, 4, serve to prevent lateral displacement of the rear end of the wagon-body on the bolster, but allow its free movement longitudinally, as the front axle turns or changes its angle to the rear axle. As an alternative, I may dispense with the stakes H and employ bars I, Figs. 2, 3, attached to the under side of the wagon-body M, lengthwise thereof, and working in contact with vertical rollers K, which are pivoted in brackets $c$. In such case the wagon-body may be conveniently made as wide as the space between the wheels will permit, and may be provided with ribs $e$, Fig. 2, to support it upon the rollers F above the brackets $c$. When a wagon-body is provided with loops they may be made to work in guards or guides N, Fig. 5, and bear on the rollers F. The wagon-body M is curved at $d$, to allow the front wheels to pass under it when turning on a short curve.

By the above-described manner of connecting the front and rear parts of the running-gear, and attaching the wagon-body thereto, I adapt the wagon to turn within the narrowest limits, since the pairs of wheels may be caused to track, or describe the same circle; 1 dispense with a supplementary reach or other means for connecting the front and rear axles, such as have been heretofore employed in combination with a jointed reach; the rear end of the wagon-body moves freely on the axle, or with little friction, and may be easily slid backward for dumping its contents. The invention is embodied in a simple, strong, and inexpensive construction and arrangement of parts, having great facility and extent of movement.

What I claim is—

The reach formed of two parts, A B, jointed contiguous to the front hounds, and rigidly connected to the front and rear axles, respectively, the wagon-body M, pivoted to the front axle, supported at its rear end by friction-rollers F, all combined as shown and described, to operate as and for the purpose specified.

WILLIAM BUCKERIDGE.

Witnesses:
 FRANK WHIPPLE,
 JOHN McNEIL.